US 8,745,036 B2

(12) United States Patent
Burger

(10) Patent No.: US 8,745,036 B2
(45) Date of Patent: Jun. 3, 2014

(54) SYSTEM, METHOD, AND COMPUTER-READABLE MEDIUM FOR ENHANCING QUERY EXECUTION BY AN OPTIMIZER IN A DATABASE SYSTEM

(75) Inventor: Louis Burger, Escondido, CA (US)

(73) Assignee: Teradata US, Inc., Dayton, OH (US)

( * ) Notice: Subject to any disclaimer, the term of this patent is extended or adjusted under 35 U.S.C. 154(b) by 501 days.

(21) Appl. No.: 12/498,391

(22) Filed: Jul. 7, 2009

(65) Prior Publication Data

US 2011/0010359 A1    Jan. 13, 2011

(51) Int. Cl.
*G06F 7/00* (2006.01)
*G06F 17/30* (2006.01)

(52) U.S. Cl.
USPC ........................................................ 707/718

(58) Field of Classification Search
USPC ........................................................ 707/718
See application file for complete search history.

(56) References Cited

U.S. PATENT DOCUMENTS

| | | | |
|---|---|---|---|
| 7,383,246 B2 * | 6/2008 | Lohman et al. ................ 1/1 |
| 7,716,215 B2 * | 5/2010 | Lohman et al. ................ 707/721 |
| 7,877,381 B2 * | 1/2011 | Ewen et al. .................. 707/719 |
| 8,200,659 B2 * | 6/2012 | Zibitsker ...................... 707/719 |
| 8,271,457 B2 * | 9/2012 | Vos et al. ..................... 707/688 |
| 2004/0181370 A1 * | 9/2004 | Froehlich et al. ............ 702/187 |
| 2005/0192937 A1 * | 9/2005 | Barsness et al. ............. 707/3 |
| 2005/0228779 A1 * | 10/2005 | Chaudhuri et al. ........... 707/3 |
| 2006/0136396 A1 * | 6/2006 | Brobst ........................... 707/3 |
| 2009/0094191 A1 * | 4/2009 | Chaudhuri et al. ........... 707/2 |
| 2010/0191720 A1 * | 7/2010 | Al-Omari et al. ............ 707/718 |
| 2010/0198806 A1 * | 8/2010 | Graefe et al. ................ 707/713 |

OTHER PUBLICATIONS

Ives et al., "Adapting to Source Properties in Processing Data Integration Queries", 2004, ACM.*
Babcock et al., "Towards a Robust Query Optimizer: A Principled and Practiced Approach", 2005, ACM.*
Hazelwood, "Feedback-Directed Query Optimization", 2003, Harvard University.*

* cited by examiner

*Primary Examiner* — Jeffrey A Burke
(74) *Attorney, Agent, or Firm* — Steve McDonald; Randy L. Campbell, Jr.

(57) ABSTRACT

A system, method, and computer-readable medium that provide automatic and dynamic control of optimizer settings in a large complex system environment are provided. The optimizer may pursue more aggressive query execution plans and switch to a more conservative approach in cases of actual observed inaccuracies.

20 Claims, 5 Drawing Sheets

SYSTEM, METHOD, AND COMPUTER-READABLE MEDIUM FOR ENHANCING QUERY EXECUTION BY AN OPTIMIZER IN A DATABASE SYSTEM

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost, e.g., response time, CPU processing, I/O processing, network processing, as determined by an optimizer. The response time is the amount of time it takes to complete the execution of a query on a given system. In this context, a "workload" is a set of requests, which may include queries or utilities, such as loads, that have some common characteristics, such as application, source of request, type of query, priority, response time goals, etc.

Contemporary research involves improving the "robustness" of a query optimizer, where robustness is characterized by query execution plans whose performance are predictable and consistent. From the standpoint of system management, the predictability of query plan performance is very important. When the actual cost of a query plan deviates significantly from the optimizer's estimate, it becomes more difficult to tune and manage the performance of a large system.

Although query robustness is a desirable goal, there is often a tradeoff between query robustness and the goal of achieving the best possible query performance. Optimizers frequently have a choice between a conservative query execution plan that will perform reasonably well in most situations, and an aggressive plan that performs very well if the cost estimates and runtime assumptions are accurate. However, if the cost estimates and runtime assumptions are not accurate, the performance of processing an aggressive plan may be significantly degraded. The decision of whether to pursue an aggressive strategy is strongly influenced by a "confidence" parameter that the optimizer assigns to its estimates which, in turn, are based on various factors, such as the presence of statistics. Such confidence parameters are typically included in the plan information made available to system management tools which may alter rule enforcement logic in view of the confidence parameters. For example, an optimizer's upper bound costs may be used in place of lower bound costs when the associated confidence level is below a particular level.

Although it is useful to factor in the optimizer's assigned confidence levels when regulating workload performance, contemporary approaches are inherently passive and reactive with regards to controlling the desired level of optimizer aggressiveness. As noted above, there is often a tradeoff between predictability and performance, and setting the appropriate balance between the two competing goals must take into account the specific requirements of the individual application or workload. For example, certain workloads or operating environments comprising complex ad hoc queries may often have aggressive plans applied thereto even if they occasionally perform much worse than anticipated. Other environments, such as those comprising fairly short running transactions, may require system performance that is known and consistently obtainable even if the performance level is not optimal. However, no mechanisms are currently available that provide for proactively controlling an optimizer's pursuit of robustness for individual workloads or queries.

SUMMARY

Disclosed embodiments provide a system, method, and computer readable medium for automatic and dynamic control of optimizer settings in a large complex system environment. The optimizer may pursue more aggressive query execution plans and switch to a more conservative approach in cases of actual observed inaccuracies.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

No mechanisms are currently available that provide for proactively controlling an optimizer's pursuit of robustness for individual workloads or queries by mechanisms integrated with an automated management system. In accordance with disclosed embodiments, automated management system mechanisms provide features that assist a user in setting and adjusting the Optimizer's pursuit of robustness for individual workloads or queries.

Figure 1:
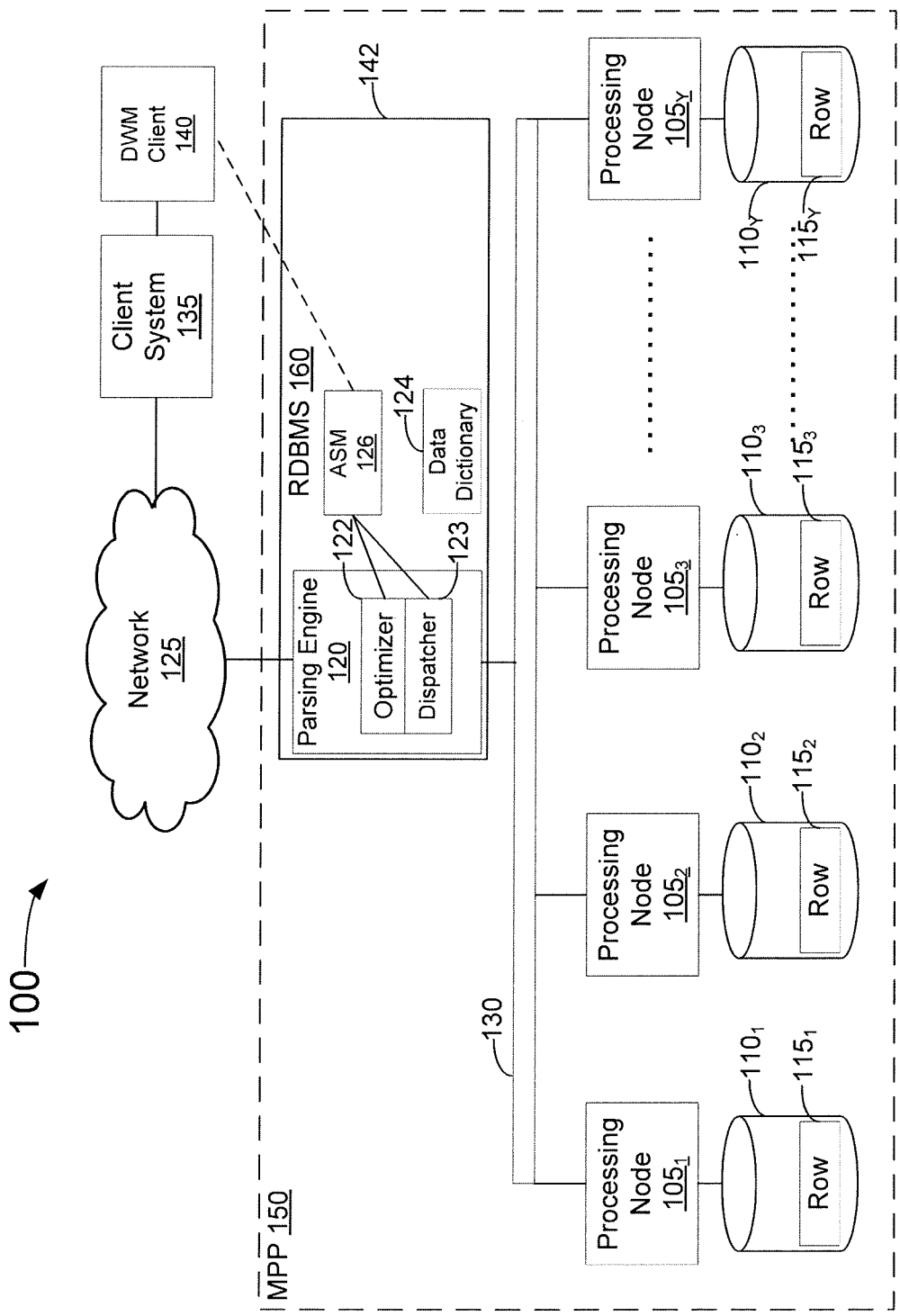
FIG. 1 depicts a diagrammatic representation of an exemplary architecture for a large database system that is suited for implementing mechanisms that control an optimizer's execution plan of a query in accordance with disclosed embodiments.

FIG. 1 depicts a diagrammatic representation of an exemplary architecture for a large database system 100, such as a Teradata Active Data Warehousing System, that is suited for implementing mechanisms that control an optimizer's pursuit of robustness in accordance with disclosed embodiments.

The database system 100 includes a relational database management system (RDBMS) 160 built upon a massively parallel processing (MPP) system 150. As shown, the database system 100 includes one or more processing nodes 105$_{1...Y}$ that manage the storage and retrieval of data in data-storage facilities 110$_{1...Y}$. Each of the processing nodes may host one or more physical or virtual processing modules, such as one or more access module processors (AMPs). Each of the processing nodes 105$_{1...Y}$ manages a portion of a database that is stored in a corresponding one of the data-storage facilities 110$_{1...Y}$. Each of the data-storage facilities 110$_{1...Y}$ includes one or more disk drives or other storage medium.

The system stores data in one or more tables in the data-storage facilities 110$_{1...Y}$. The rows 115$_{1...Y}$ of the tables are stored across multiple data-storage facilities 110$_{1...Y}$ to ensure that the system workload is distributed evenly across the processing nodes 105$_{1...Y}$. A parsing engine 120 organizes the storage of data and the distribution of table rows 115$_{1...Y}$ among the processing nodes 105$_{1...Y}$ and accesses processing nodes 105$_{1...Y}$ via an interconnect 130. The parsing engine 120 also coordinates the retrieval of data from the data-storage facilities 110$_{1...Y}$ in response to queries received from a user, such as one at a client computer system 135 connected to the database system 100 through a network 125 connection. The client computer system 135 may run a dynamic workload manager (DWM) client 140. The parsing engine 120, on receiving an incoming database query, applies an optimizer 122 component to the query to assess the best plan for execution of the query. Selecting the optimal query-execution plan includes, among other things, identifying which of the processing nodes 105$_{1...Y}$ are involved in executing the query and which database tables are involved in the query, as well as choosing which data-manipulation techniques will serve best in satisfying the conditions of the query. To this end, the parser and/or optimizer may access a data dictionary 124 that specifies the organization, contents, and conventions of one or more databases. For example, the data dictionary 124 may specify the names and descriptions of various tables maintained by the MPP system 150 as well as fields of each database. Further, the data dictionary 124 may specify the type, length, and/or other various characteristics of the stored tables. The database system typically receives queries in a standard format, such as the Structured Query Language (SQL) put forth by the American National Standards Institute (ANSI).

The system 100 may include an active system management (ASM) 126 module. The ASM may be implemented as a "closed-loop" system management (CLSM) architecture capable of satisfying a set of workload-specific goals. In other words, the system is a goal-oriented workload management system capable of supporting complex workloads and capable of self-adjusting to various types of workloads. The ASM 126 is communicatively interfaced with the optimizer 122 and is adapted to convey a confidence threshold parameter, T, (described more fully hereinbelow) and associated parameters to the optimizer 122. Further, the ASM 126 is communicatively interfaced with a dispatcher 123 to receive query execution plan costs therefrom, and to facilitate query exception monitoring and automated modifications of confidence threshold parameters in accordance with disclosed embodiments. Further, the DWM client 140 is communicatively interfaced with the ASM 126.

The ASM 126 operation has four major phases: 1) assigning a set of incoming request characteristics to workload groups, assigning the workload groups to priority classes, and assigning goals (referred to as Service Level Goals or SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance. In accordance with disclosed embodiments, the ASM 126 is adapted to facilitate control of the optimizer 122 pursuit of robustness with regard to workloads or queries.

Figure 2:
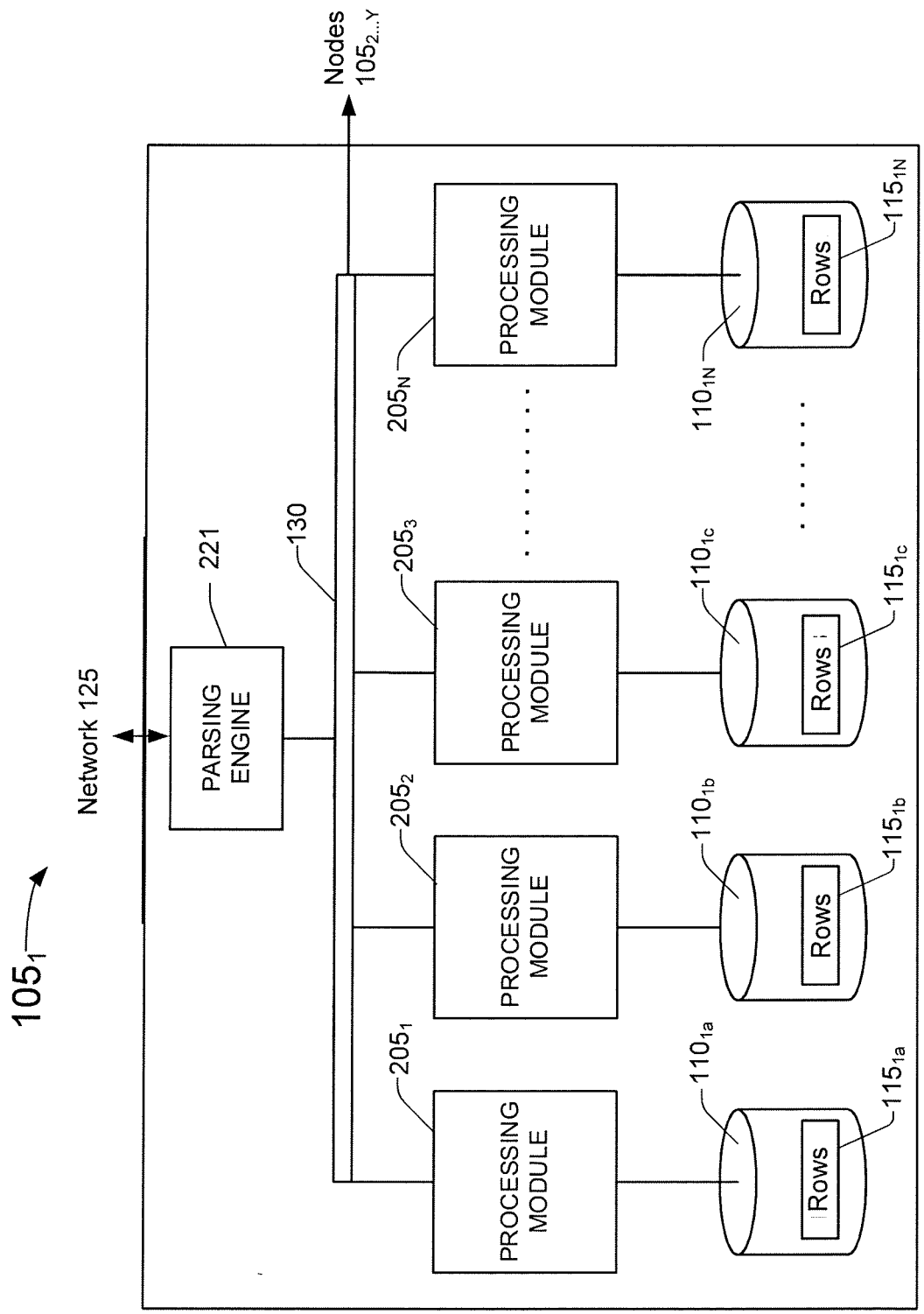
FIG. 2 depicts a diagrammatic representation of a sample architecture for one node of the database system depicted in FIG. 1.

FIG. 2 depicts a diagrammatic representation of a sample architecture for one node 105$_1$ of the DBS 100. The DBS node 105$_1$ includes one or more processing modules 205$_{1...N}$, e.g., AMPs, connected by an interconnect 130 that manage the storage and retrieval of data in data-storage facilities 110$_{1a...1N}$. The processing module 205$_{1...N}$ and the dispatcher 123 depicted in FIG. 1 are collectively referred to herein as a runtime query execution system. Each of the processing modules 205$_{1...N}$ may be one or more physical processors or each may be a virtual processor, with one or more virtual processors running on one or more physical processors. For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules 205$_{1...N}$ manages a portion of a database that is stored in a corresponding one of the data-storage facilities 110$_{1a...1N}$. Each of the data-storage facilities 110$_{1a...1N}$ includes one or more disk drives. The DBS may include multiple nodes 105$_{2...Y}$ in addition to the illustrated node 105$_1$, connected by way of the interconnect 130.

The system stores data in one or more tables in the data-storage facilities 110$_{1a...1N}$. The rows 115$_{1a...1N}$ of the tables are stored across multiple data-storage facilities 110$_{1a...1N}$ to ensure that the system workload is distributed evenly across the processing modules 205$_{1...N}$. A parsing engine 221 organizes the storage of data and the distribution of table rows 110$_{1a...1N}$ among the processing modules 205$_{1...N}$. The parsing engine 221 also coordinates the retrieval of data from the data-storage facilities 110$_{1a...1N}$ in response to queries received from a user at a client computer system 135$_{1...N}$. The DBS 100 usually receives queries and commands to build tables in a standard format, such as SQL.

In one implementation, the rows 115$_{1a...1N}$ are distributed across the data-storage facilities 110$_{1a...1N}$ by the parsing engine 221 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities 110$_{1a...1N}$ and associated processing modules 205$_{1...N}$ by a hash bucket map. The characteristics of the columns chosen for the primary index determine how evenly the rows are distributed.

Figure 3:
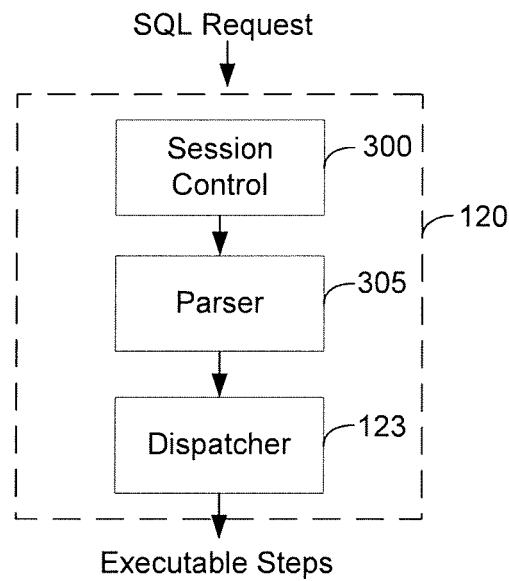
FIG. 3 is a diagrammatic representation of a parsing engine implemented in accordance with an embodiment.
Figure 4:
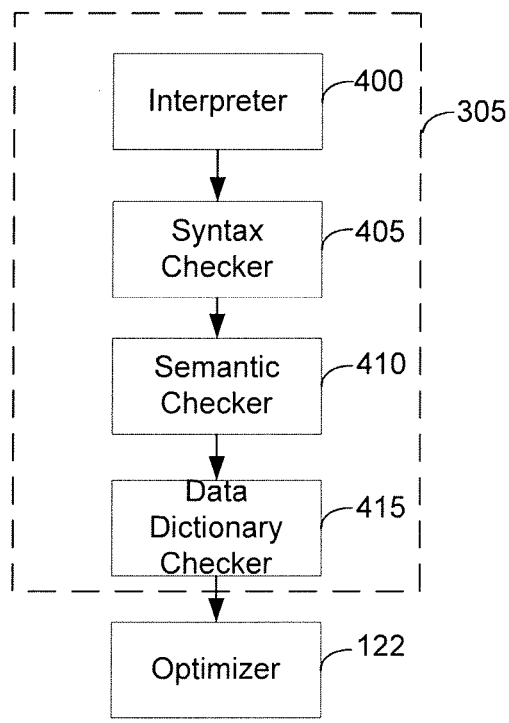
FIG. 4 is a diagrammatic representation of a parser implemented in accordance with an embodiment.

In one example system, a parsing engine, such as the parsing engine 120, is made up of three components: a session control 300, a parser 305, and a dispatcher 123 as shown in FIG. 3. The session control 300 provides the logon and logoff functions. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults a data dictionary to ensure that all of the objects specified in the SQL request exist and that the user has the authority to perform the request (block 415). Finally, the parser 305 runs the optimizer 122 that selects the least expensive plan to perform the request, and a dispatcher 123 coordinates the runtime execution of executable steps of the optimizer's 122 query execution plan with the processing modules $205_1$-$205_N$.

To facilitate implementations of disclosed embodiments of automated adaptive query execution strategies, the ASM 126 is configured to monitor runtime exception criteria. The ASM 126 monitoring takes place by communicating with the dispatcher 123 component as it checks the query execution step responses from the processing modules $205_1$-$205_N$. The step responses include the actual cost information, which the dispatcher 123 may then communicate to the ASM 126 which, in turn, compares the actual cost information with the optimizer's 122 estimated costs.

In accordance with disclosed embodiments, optimizer predictability, i.e., the actual query execution costs relative to the query execution estimated costs, and consistency, i.e., similar queries have similar performance, are significantly improved. Improved optimizer performance is facilitated by applying probability mechanisms to cardinality estimation in an embodiment. Further, a user specified optimizer parameter that controls the desired level of robustness and the resulting tradeoff with potential performance is employed. The optimizer mechanism is further enhanced by allowing setting and adjustment of an optimizer parameter in the context of automated system management.

In an embodiment, a "Confidence Threshold Parameter" may have a value that is set as a system wide setting. Additionally, the confidence threshold parameter may have a value that is set on a per query and/or per workload basis. Further, the confidence threshold parameter may be implemented as a session level parameter, e.g., per user database system session. Still further, disclosed mechanisms advantageously facilitate the simplification of setting and control of the confidence threshold parameter in large database systems.

A user specified confidence threshold parameter of T % supplied to the optimizer specifies a quantification of the desired confidence that query execution costs will not exceed estimated costs. In this manner, the confidence threshold parameter causes the optimizer to estimate costs such that it is T % confident that the actual query execution cost will not exceed the query execution estimated cost. Hence, increasing the confidence threshold parameter causes the optimizer to utilize a more conservative query execution plan, and decreasing the confidence threshold parameter results in the optimizer utilizing a more aggressive query execution plan. For example, setting the confidence threshold parameter at 80% may be utilized for general purpose processing, and a confidence threshold parameter value of 95% may be utilized to achieve very stable plans. In a large complex system, it may not be feasible for a user to manually set the confidence threshold parameter for the diverse workloads and operating environments, and in such a system the confidence threshold parameter may be set by an automated management system.

The ASM 126 may feature a Dynamic Workload Manager that offers a variety of features that allow DBAs to regulate workload performance. One such feature is a state matrix comprised of two dimensions defining the different operating environments and system conditions. Operating environments may represent different time periods or workload windows when certain applications are run. In accordance with an embodiment, the operating environment is extended to optionally include the user specified confidence threshold parameter. Whenever the system is in a state corresponding to a given operating environment, by default all active queries may be optimized with a system wide setting of the confidence threshold parameter corresponding to the particular operating environment. For example, when the system is in an operating environment representing a mixture of ad hoc queries, the assigned confidence threshold may be set low, e.g., less than 80%, to direct the optimizer to be aggressive in the utilized query execution plans.

The Dynamic Workload Manager may also support the classification and grouping of queries into workloads (WDs) along with workload specific rules and conditions to regulate the resources allocated to the workloads. The definition process for a WD is enhanced to optionally include a specified optimization confidence threshold parameter for queries that execute as part of the WD. The optimizer's per-query confidence threshold parameter is then set for each query executing as part of the WD.

In some cases, the nature of the queries grouped into a given workload will lend themselves to a certain confidence threshold. In such cases, the specified threshold for a given workload can remain fixed. In other cases, the appropriate fixed threshold value for a given workload may not be as clear. Furthermore, in some instances, many users may prefer to not have to make a predetermined trade off when it comes to query optimization. Instead, the user may desire plans that are both aggressively optimized for performance as well as predictable and accurately costed, and for certain workloads this may be possible. Such users may desire to start out with aggressive optimization, i.e., a low confidence threshold, and only revert to a more conservative strategy if and when actual costing mistakes are observed in the workload.

To support an adaptive confidence strategy of this type, mechanisms implemented in accordance with disclosed embodiments provide a type of runtime exception criteria that monitors problems in optimizer predictability. After defining a WD with an initial confidence threshold parameter of T %, users may define runtime exception criteria and a corresponding corrective action. In this implementation, a runtime exception type that represents a significant costing error is utilized whereby an exception is considered to have occurred if the observed total plan execution cost is in error by an amount that equals or exceeds a corresponding optimizer execution plan cost estimate by an amount specified by an error threshold, E %. In addition to defining the error threshold, E, users may also define a maximum number of exception instances, N, that that will be tolerated in a given time period for all queries in the workload before the defined corrective action is taken. Lastly, as part of the corrective action definition, users may specify an adjusted confidence parameter, A %, where A must be greater than the confidence threshold parameter T.

Figure 5:
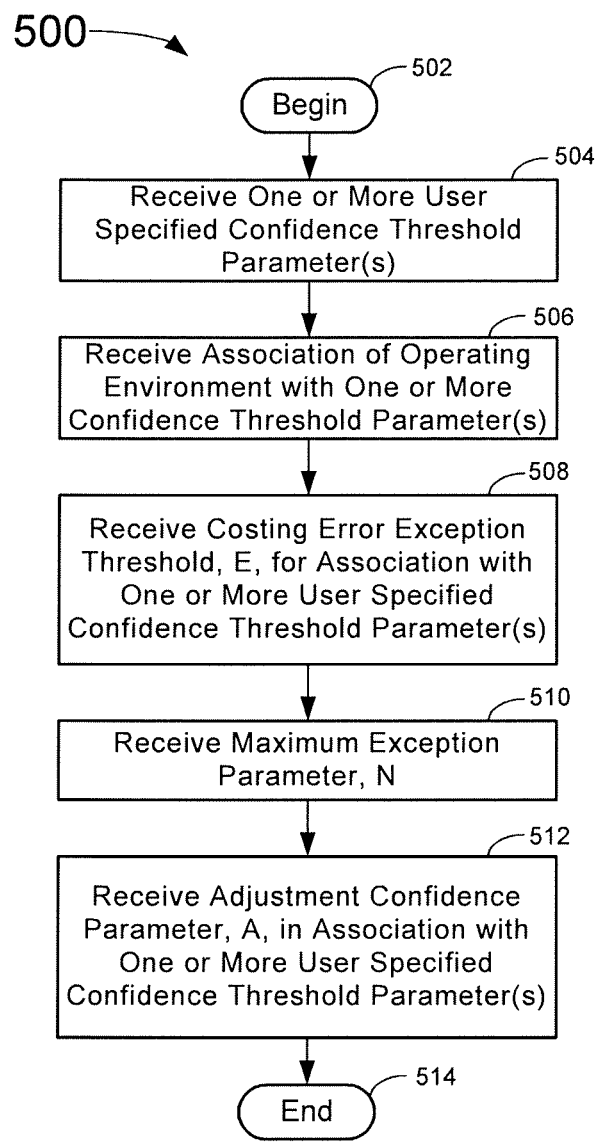
FIG. 5 is a flowchart of an optimizer parameter specification routine implemented in accordance with disclosed embodiments.

FIG. 5 is a flowchart 500 of an optimizer parameter specification routine implemented in accordance with disclosed embodiments. The processing steps of FIG. 5 may be implemented as computer-executable instructions tangibly embodied on a computer-readable medium executable by a processing system, such as one or more of the processing nodes $105_1$-$105_Y$ depicted in FIG. 1.

The parameter specification routine is invoked (step 502), and one or more user specified confidence threshold parameters are received by the ASM or other processing module (step 504). For example, the user may specify a confidence threshold parameter, T, via the DWM client 140 for a particular query, another confidence threshold parameter, T, for a workload, and another confidence threshold parameter, T, for a system setting confidence parameter. Optionally, one or more operating environments are received in association with a respective user specified confidence threshold (step 506), e.g., as specified by the user via the DWM client 140. One or more costing error exception threshold(s), E, may then be received from the user, e.g., via the DWM client 140, each in association with a respective user specified confidence threshold parameter, T (step 508). One or more maximum exception parameter(s), N, may then be received from the user, e.g., via the DWM client 140, that specify an exception threshold for workload and/or as a system setting maximum exception parameter (step 510). One or more adjustment confidence parameter(s), A, may be received from the user, e.g., via the DWM client 140, in association with a corresponding confidence threshold parameter, T, that specify an adjustment percentage of the confidence threshold parameter in the event that the number of exceptions is detected to exceed the maximum exception parameter of the corresponding query, workload, or system setting (step 512). The optimizer parameter specification routine cycle may then end (step 514).

Figure 6:
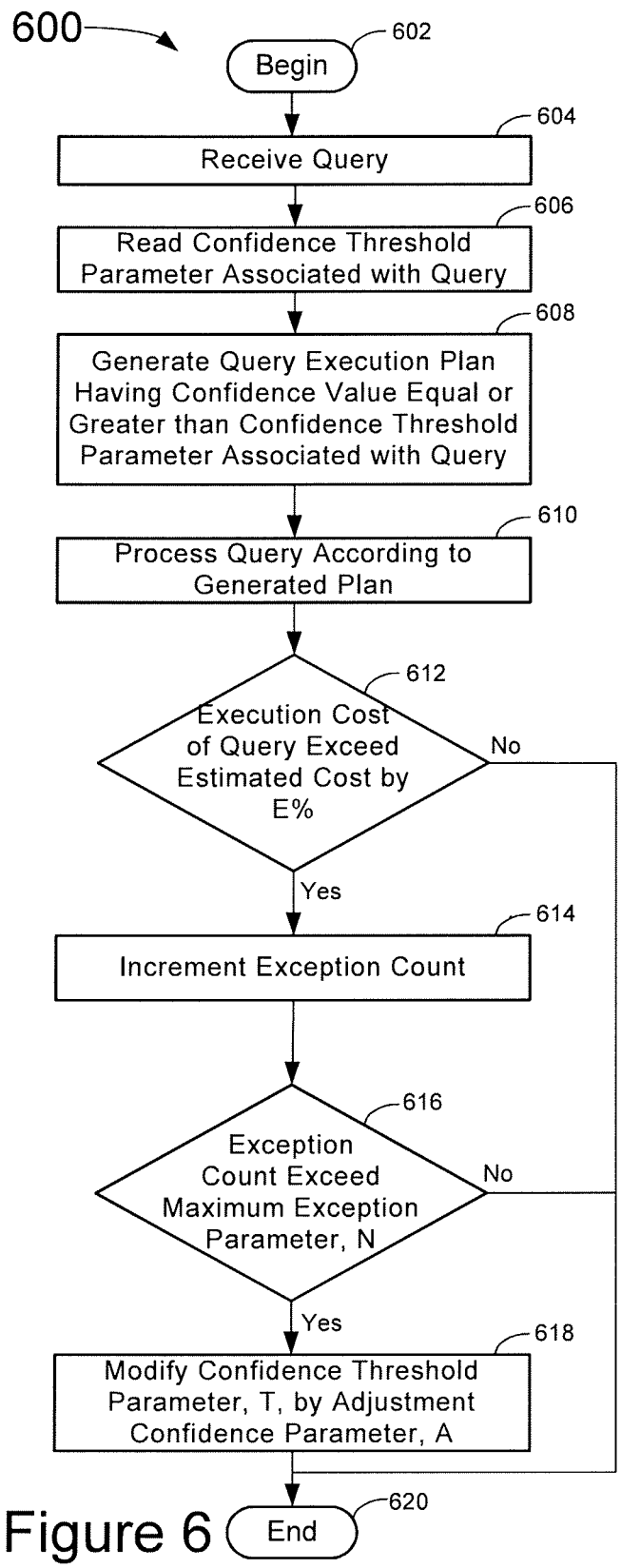
FIG. 6 is a flowchart of an optimizer query processing routine implemented in accordance with disclosed embodiments.

FIG. 6 is a flowchart 600 of a query processing routine implemented in accordance with disclosed embodiments. The processing steps of FIG. 6 may be implemented as computer-executable instructions tangibly embodied on a computer-readable medium executable by a processing system, such as one or more of the processing nodes $105_1$-$105_Y$ depicted in FIG. 1.

The query processing routine is invoked (step 602), and a query is received by the optimizer (step 604). The query may be independently issued to the optimizer or may comprise one of a plurality of workload queries. The optimizer then reads the confidence parameter threshold, T, associated with the query (step 606). An execution plan is then generated by the optimizer in accordance with the confidence threshold parameter (step 608). That is, the optimizer generates a query execution plan with an optimizer confidence level that equals or exceeds the confidence parameter threshold.

The ASM, upon execution of the query (step 610), may then evaluate the performance of the query execution to determine if cost parameters of the query execution, e.g., execution time, processor consumption, etc., exceeded the optimizer cost estimate for the query plan by an amount equaling or exceeding the error threshold, E (step 612). If not, the processing routine cycle may end (step 620).

Returning again to step 612, in the event that the execution cost of the query exceeded the optimizer estimate by an amount equaling or exceeding the error threshold, E, the ASM may then increment an exception count (step 614), and an evaluation may then be made to determine if the exception count exceeds the maximum exception parameter, N (step 616). If the exception count does not exceed the maximum exception parameter, N, the processing routine cycle may end according to step 620. If the exception count does exceed the maximum exception parameter, N, the confidence parameter threshold, T, value may be modified according to the adjustment confidence parameter, A (step 618). That is, the confidence threshold parameter may then be set to the adjustment confidence parameter, A. The processing routine cycle may then end according to step 620.

As an example, a WD may be defined with an initial confidence threshold of T=80%. An error exception threshold, E, may be specified as 100%, a maximum exception parameter, N, may be set to 5 per hour, and an adjustment confidence parameter, A, may be set to 95% for the WD. In accordance with disclosed embodiments, an exception will occur whenever the actual query cost is over twice the optimizer's estimated cost. Thus, if five or more such exceptions occur per hour, the optimizer is then instructed to utilize more conservative query execution plans (using a 95% confidence threshold parameter) when optimizing subsequent queries executed as part of the workload.

As described, the disclosed mechanisms advantageously provide automatic and dynamic control of optimizer settings in a large complex system environment. The optimizer may pursue more aggressive query execution plans and switch to a more conservative approach in cases of actual observed inaccuracies.

The flowchart of FIGS. 5-6 depict process serialization to facilitate an understanding of disclosed embodiments and are not necessarily indicative of the serialization of the operations being performed. In various embodiments, the processing steps described in FIGS. 5-6 may be performed in varying order, and one or more depicted steps may be performed in parallel with other steps. Additionally, execution of some processing steps of FIGS. 5-6 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of improving the robustness of an optimizer executable by a processor and the predictability of the performance of execution plans in a database system, comprising:
   receiving, with the optimizer, a first query to be executed, wherein the first query is one of a plurality of requests in a database workload;
   obtaining, with the optimizer, a confidence threshold parameter associated with the first query;
   generating, with the optimizer, a query execution plan for the first query utilizing an optimizer confidence value compliant with the confidence threshold parameter;
   obtaining, with a runtime query execution system executable by the processor, an error exception threshold associated with the first query;
   determining, with the runtime query execution system, an exception count, wherein the exception count is indicative of a number of times that a query execution cost of the query execution plan exceeds an optimizer estimated cost of the query execution plan by an amount that exceeds the error exception threshold;
   determining, with the runtime query execution system, the exception count equals a maximum exception count parameter within a predetermined period of time;
   generating, with the runtime query execution system, an adjusted confidence threshold parameter responsive to determining the exception count equals the maximum exception count parameter within the predetermined period of time; and
   applying, with the optimizer, the adjusted confidence threshold parameter to at least one other request in the database workload.

2. The method of claim 1, further comprising generating, with the optimizer, an execution plan for a second query according to the adjusted confidence threshold parameter.

3. The method of claim 1, wherein the confidence threshold parameter is a user-selected confidence threshold parameter.

4. The method of claim 1, wherein the maximum exception count parameter is a user-specified maximum exception count parameter.

5. The method of claim 1, wherein generating, with the runtime query execution system, an adjusted confidence threshold parameter comprises setting the confidence threshold parameter to a value of the adjusted confidence threshold parameter.

6. The method of claim 1, further comprising incrementing, with the runtime query execution system, the exception count to indicate that the query execution cost of the query execution plan exceeds the optimizer estimated cost of the query execution plan by an amount that exceeds the error exception threshold.

7. The method of claim 1, wherein the confidence threshold parameter is associated with a specified workload.

8. The method of claim 1, wherein the confidence threshold parameter is associated with a specified operating environment classification of the database system.

9. A non-transitory computer-readable medium having computer-executable instructions for execution by a processing system, the computer-executable instructions for improving the robustness of an optimizer and the predictability of the performance of execution plans in a database system, the computer-executable instructions, when executed, cause the processing system to:
   receive, with the optimizer of the database system, a first query to be executed, wherein the first query is one of a plurality of requests in a database workload;
   obtain, with the optimizer, a confidence threshold parameter associated with the first query;
   generate, with the optimizer, a query execution plan for the first query utilizing an optimizer confidence value compliant with the confidence threshold parameter;
   obtain, with a runtime query execution system, an error exception threshold associated with the first query;
   determine an exception count with the runtime query execution system, wherein the exception count is indicative of a number of times that a query execution cost of the query execution plan exceeds an optimizer estimated cost of the query execution plan by an amount that exceeds the error exception threshold;
   determine, with the runtime query execution system, that the exception count equals a maximum exception count parameter within a predetermined period of time;
   generate, with the runtime query execution system, an adjusted confidence threshold parameter responsive to the determination that the exception count equals the maximum exception count parameter within the predetermined period of time; and
   apply, with the optimizer, the adjusted confidence threshold parameter to at least one other request in the database workload.

10. The non-transitory computer-readable medium of claim 9, further comprising instructions that, when executed by the processing system, generate, with the optimizer, an execution plan for a second query according to the adjusted confidence threshold parameter.

11. The non-transitory computer-readable medium of claim 9, wherein the confidence threshold parameter is a user-selected confidence threshold parameter.

12. The non-transitory computer-readable medium of claim 9, wherein the maximum exception count parameter a user-selected maximum exception count parameter.

13. The non-transitory computer-readable medium of claim 9, wherein the instructions that generate, with the runtime query execution system, an adjusted confidence threshold parameter comprise instructions that, when executed, cause the processing system to set, with the runtime query execution system, the confidence threshold parameter to a value of the adjusted confidence threshold parameter.

14. The non-transitory computer-readable medium of claim 9, further comprising instructions that, when executed by the processing system, cause the processing system to increment, with the runtime query execution system, the exception count to indicate that the query execution cost of the query execution plan exceeds the optimizer estimated cost of the query execution plan by an amount that exceeds the error exception threshold.

15. The non-transitory computer-readable medium of claim 9, wherein the confidence threshold parameter is associated with a specified workload.

16. The non-transitory computer-readable medium of claim 9, wherein the confidence threshold parameter is associated with a specified operating environment classification of the database system.

17. A computer system having a database management system configured to improve the robustness of an optimizer and the predictability of the performance of execution plans, comprising:
  at least one storage medium on which the database management system and a table on which a query is applied is stored; and
  at least one processing module that:
  receives, with the optimizer executed thereby, a first query to be executed;
  obtains a first and a second confidence threshold parameter associated with the first query;
  generates a query execution plan for the first query utilizing an optimizer confidence value compliant with the first confidence threshold parameter;
  obtains an error exception threshold associated with the first query;
  determines an exception count, wherein the exception count is indicative of a number of times that a query execution cost of the query execution plan exceeds an optimizer estimated cost of the query execution plan by an amount that exceeds the error exception threshold;
  determines that the exception count equals a maximum exception count parameter within a predetermined period of time;
  selects the second confidence threshold parameter in response to the determination that the exception count equals the maximum exception count parameter within the predetermined period of time; and
  generates an execution plan for a second query according to the second confidence threshold parameter.

18. The system of claim 17, wherein the first confidence threshold parameter and the second confidence threshold parameter are user-supplied.

19. The system of claim 17, wherein the maximum exception count parameter is a user-specified maximum exception count parameter.

20. The system of claim 17, wherein a runtime query execution system increments the exception count to indicate that the query execution cost of the query execution plan exceeds the optimizer estimated cost of the query execution plan by an amount that exceeds the error exception threshold.

* * * * *